United States Patent
Qi et al.

(10) Patent No.: US 9,281,548 B2
(45) Date of Patent: Mar. 8, 2016

(54) BATTERY MODULE FOR MITIGATING GAS ACCUMULATION AND METHODS THEREOF

(71) Applicant: GM Global Technology Operations LLC, Detroit, MI (US)

(72) Inventors: Yue Qi, Troy, MI (US); John Moote, Plymouth, MI (US); Qian Lin, Troy, MI (US); Stephen J. Harris, Walnut Creek, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 13/826,506

(22) Filed: Mar. 14, 2013

(65) Prior Publication Data

US 2014/0272514 A1    Sep. 18, 2014

(51) Int. Cl.
*H01M 10/52* (2006.01)
*H01M 10/04* (2006.01)
*H01M 2/10* (2006.01)
*H01M 10/625* (2014.01)
*H01M 10/647* (2014.01)
*H01M 10/6555* (2014.01)
*H01M 10/613* (2014.01)

(52) U.S. Cl.
CPC ............ *H01M 10/52* (2013.01); *H01M 2/1077* (2013.01); *H01M 10/0468* (2013.01); *H01M 10/613* (2015.04); *H01M 10/625* (2015.04); *H01M 10/647* (2015.04); *H01M 10/6555* (2015.04); *Y10T 29/49108* (2015.01)

(58) Field of Classification Search
CPC   H01M 10/52; H01M 10/498; H01M 10/0468
USPC .................................. 429/120, 158; 29/623.1
See application file for complete search history.

(56) References Cited

U.S. PATENT DOCUMENTS

| 6,087,036 A * | 7/2000 | Rouillard et al. ............... 429/66 |
| 2013/0157101 A1 * | 6/2013 | Heise ............................ 429/120 |

FOREIGN PATENT DOCUMENTS

CN    101557022 A    10/2009

* cited by examiner

*Primary Examiner* — Stewart Fraser
(74) *Attorney, Agent, or Firm* — Fraser Clemens Martin & Miller LLC; William A. Ziehler

(57) ABSTRACT

A battery module is provided. The battery module includes a plurality of battery cell assemblies configured to electrically communicate with each other. Each battery cell assembly has an electrode stack enclosed by a case. The electrode stack is positioned in the case to form one or more peripheral spaces between the electrode stack and the case. Support members are positioned adjacent to each of the battery cell assemblies to contact a desired portion of the electrode stack. The support members are configured to focus a compressive force on a desired portion of the electrode stack. The compressive force urges gases formed during operation of the electrode stack into the peripheral spaces within the case.

18 Claims, 5 Drawing Sheets

BATTERY MODULE FOR MITIGATING GAS ACCUMULATION AND METHODS THEREOF

BACKGROUND

One or more battery modules has been proposed as a clean, efficient and environmentally responsible power source for an electric device such as an electric vehicle, for example. A plurality of individual battery cell assemblies forms a battery module. The battery cell assemblies can be of various types, such as lithium-ion battery cells, for example. The battery module is provided to supply an amount of electric power sufficient to operate the electric device.

The plurality of individual battery cell assemblies must be physically supported and protected, as well as be in electrical communication with each other and the electrical device. Further, it is often desired to provide cooling to the battery cell assemblies during a charging and a discharging thereof. During typical charging and discharging cycles, gases are formed and trapped within the battery cell assemblies. If unattended over time, the trapped gases can cause damage to the internal structures of the battery cell assemblies, such as for example, delamination of the electrodes from the current collectors or loss of electrical or ionic contact. The delamination process and the loss of electrical contact can result in a degradation of the electrical battery performance.

It would be desirable to produce a battery module wherein the effects of the gases produced within the individual battery cell assemblies during charging and discharging cycles is minimized.

SUMMARY OF THE INVENTION

According to the invention there is provided a battery module including a plurality of battery cell assemblies configured to electrically communicate with each other. Each battery cell assembly has an electrode stack enclosed by a case. The electrode stack is positioned in the case to form one or more peripheral spaces between the electrode stack and the case. Support members are positioned adjacent to each of the battery cell assemblies to contact a desired portion of the electrode stack. The support members are configured to focus a compressive force on a desired portion of the electrode stacks. The compressive force urges gases formed during operation of the electrode stack into the peripheral spaces within the case.

According to the invention there is also provided battery module including a plurality of battery cell assemblies configured to electrically communicate with each other. Each battery cell assembly has an electrode stack enclosed by a case. The electrode stack is positioned in the case to form one or more peripheral spaces between the electrode stack and the case. One or more support members is positioned adjacent to the battery cell assemblies to contact a desired portion of the electrode stack. The support members are configured to focus a compressive force on a desired portion of the electrode stack. The compressive force produces a pressure gradient within the case and the pressure gradient urges gases formed during operation of the electrode stack into the peripheral spaces within the case.

According to the invention there is also provided a method of forming a battery module including the steps of: providing a plurality of battery cell assemblies configured to electrically communicate with each other, each battery cell assembly having an electrode stack enclosed by a case, wherein the electrode stack is positioned in the case to form one or more peripheral spaces between the electrode stack and the case, and positioning one or more support members adjacent to the battery cell assemblies to contact a desired portion of the electrode stack, the support members configured to focus a compressive force on a desired portion of the electrode stack, wherein the compressive force urges gases formed during operation of the electrode stack into the peripheral spaces within the case.

Various objects and advantages of this invention will become apparent to those skilled in the art from the following detailed description of the invention, when read in light of the accompanying drawings.

DESCRIPTION OF INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a battery module having one or more battery cell assemblies in electrical communication with each other. The battery cell assemblies are structurally supported within the battery module such that the battery cell assemblies are in axial compression. Generally, the battery module includes support members interspaced between the battery cell assemblies. The support members are configured to focus additional compressive forces on selected portions of electrode stacks within the battery cell assemblies, thereby distributing gases formed within the battery cell assemblies to perimeter areas surrounding the electrode stacks. The term "battery module", as used herein, is defined to mean one or more battery cell assemblies arranged as a unit. The term "battery cell assembly", as used herein, is defined to mean any structure configured to generate and discharge electrical current.

Figure 1:
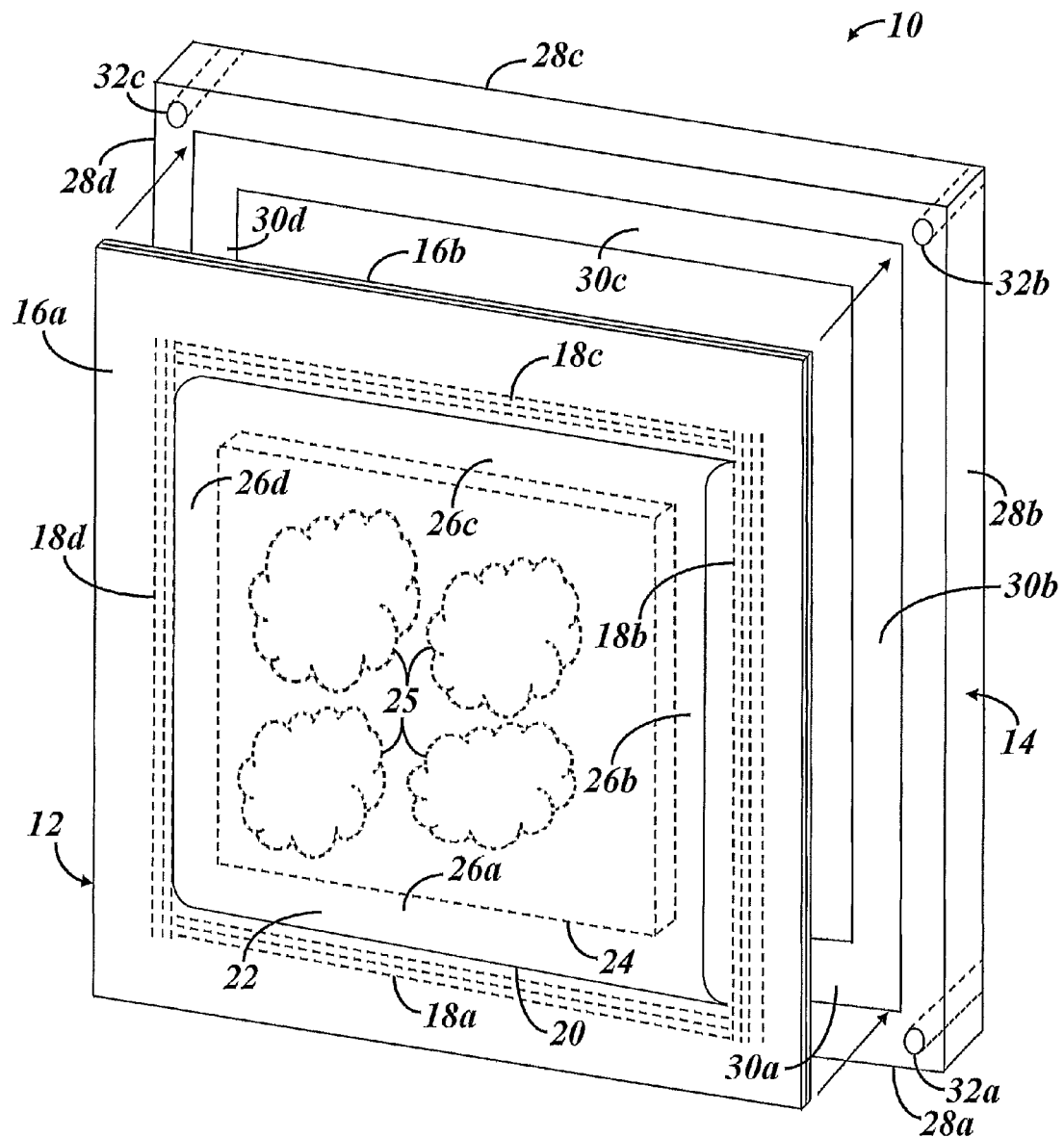
FIG. 1 is an exploded schematic perspective view of a battery cell assembly in accordance with the present invention.

Referring now to the drawings, and particularly FIG. 1, there is shown generally at 10 an exploded perspective view of a battery cell assembly incorporating the features of the invention. The battery cell assembly 10 includes a battery package 12 and a frame 14.

The battery package 12 includes opposing sheets 16a, 16b, laminated together such as to form peripheral sealed areas 18a-18d. The peripheral sealed areas 18a-18d extend from a formed case 20 to the edges of the battery package 12. In certain instances, the case 20 can be in the form of a pouch. In other instances, the case 20 can have the form of other structures, such as the non-limiting example of a prismatic metal can. In the illustrated embodiment, the peripheral sealed areas 18a-18d are formed using a heat sealing process. However, other processes sufficient to form peripheral sealed areas and a case can be used.

Referring again to FIG. 1, a cavity 22 is formed within the case 20 and an electrode stack 24 is positioned in the cavity 22. In the illustrated embodiment, the electrode stack 24 is a lithium ion (Li-ion) type of battery. However, in other embodiments, the electrode stack 24 can be other types of batteries, employing different structures and electrochemistry, without departing from the scope and spirit of the invention.

Peripheral spaces 26a-26d are formed within the case 20 between the edges of the electrode stack 24 and the sides of the case 20. The peripheral spaces 26a-26d will be discussed in more detail below.

The frame 14 includes outer peripheral sides 28a-28d and recessed peripheral shoulders 30a-30d. The frame 14 is configured to receive the battery package 12 such that the peripheral sealed areas 18a-18d seat against the recessed peripheral shoulders 30a-30d. The battery package 12 is secured within the frame 14 using any desired structures, mechanisms or devices. The outer peripheral sides 28a-28d of the frame 14 are configured to allow stacking of the battery cell assembly 10 with other battery cell assemblies, or with other structures and assemblies, as will be discussed in more detail below. It should be appreciated that the frame 14 can have any desired shape, structure or configuration sufficient to receive and secure the battery package 12 and allow for stacking with other battery cell assemblies or with other structures and assemblies.

Referring again to FIG. 1, the frame 14 includes a plurality of apertures 32a-32d positioned in the corners of the frame 14 (note only apertures 32a-32c are shown). The apertures 32a-32d extend through the outer peripheral sides 28a-28d of the frame 14 such as to allow passage of compression members (not shown) therethrough.

As will be discussed in more detail below, during charging and discharging cycles of the electrode stack 24, gases (indicated generally by reference character 25) form within the case 20.

Figure 2A:
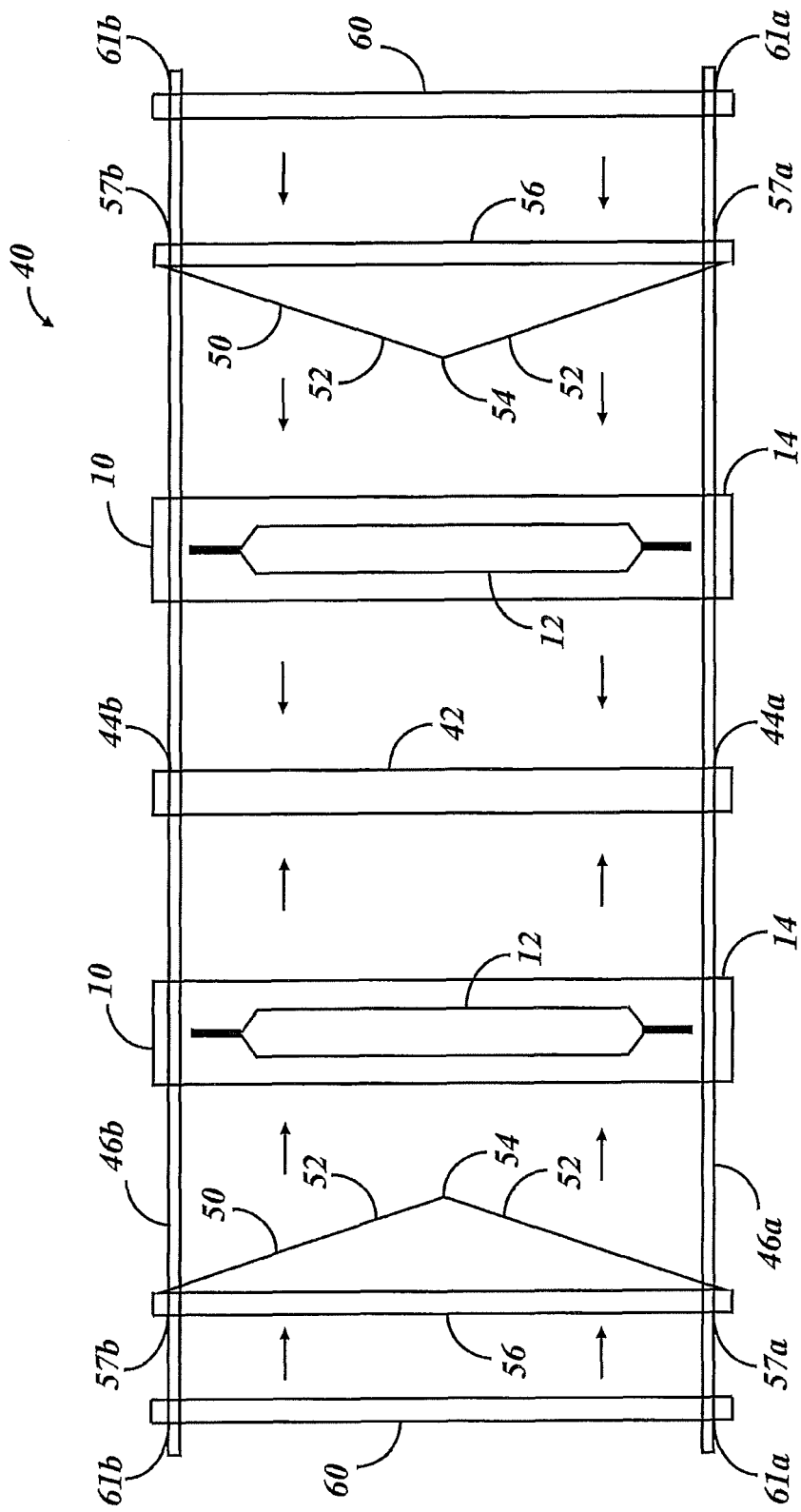
FIG. 2a is a schematic side elevational view of a battery module incorporating the battery cell assembly of FIG. 1.

Referring now to FIG. 2a, an exploded view of a battery module is shown generally at 40. The battery module 40 includes one or more battery cell assemblies 10, as shown in FIG. 1 and described above. Each of the battery cell assemblies 10 includes the battery package 12 secured to the frame 14.

A cooling module 42 is positioned between the battery assemblies 10. The cooling module 42 is configured to cool the battery assemblies 10 during charging and discharging cycles. Cooling modules 42 are known in the art and will not be described herein. In the illustrated embodiment, the cooling module 42 incorporates a liquid cooling process. However, in other embodiments, other cooling processes can be used.

Referring again to FIG. 2a, the cooling module 42 includes a plurality of apertures 44a-44d (note only apertures 44a and 44b are shown) configured to correspond to the apertures 32a-32d in the frame 14 of the battery cell assembly 10. The apertures 44a-44d are configured to allow passage of compression members 46a-46d therethrough.

Support members 50 are positioned on the outboard side of the battery cell assemblies 10. The support members 50 are configured for several functions. First, the support members 50 are configured to protectively support and cushion the battery cell assemblies 10 within the battery module 40. Second, the support members 50 are configured to focus additional compressive forces on selected portions of the battery package 12. The support members 50 will be discussed in more detail below.

Referring again to FIG. 2a, a plurality of end frames 60 is positioned outboard of the support members 50. Each end frame 60 includes a plurality of apertures 61a-61d (note only apertures 61a and 61b are shown) configured to correspond to the apertures 32a-32d in the frame 14 of the battery cell assembly 10. The apertures 61a-61d are configured to allow passage of compression members 46a-46d therethrough.

The end frames 60, coupled with the compression members 46a-46d, are configured to secure the cooling module 42, the battery cell assemblies 10 and the support members 50 together, thereby forming the battery module 40. Also, the end frames 60, coupled with the compression members 46a-46d, are further configured to compress the cooling module 42, the battery cell assemblies 10 and the support members 50 together. In the illustrated embodiment, the compression formed by the end frames 60 and the compression members 46a-46d is in the range of about 3.0 to 10.0 pounds per square inch (psi). Alternatively, in other embodiments, the compression can be less than about 3.0 psi or more than about 10.0 psi. The end frames 60 and the compression members 46a-46d are conventional in the art and will not be described herein.

Figure 2B:
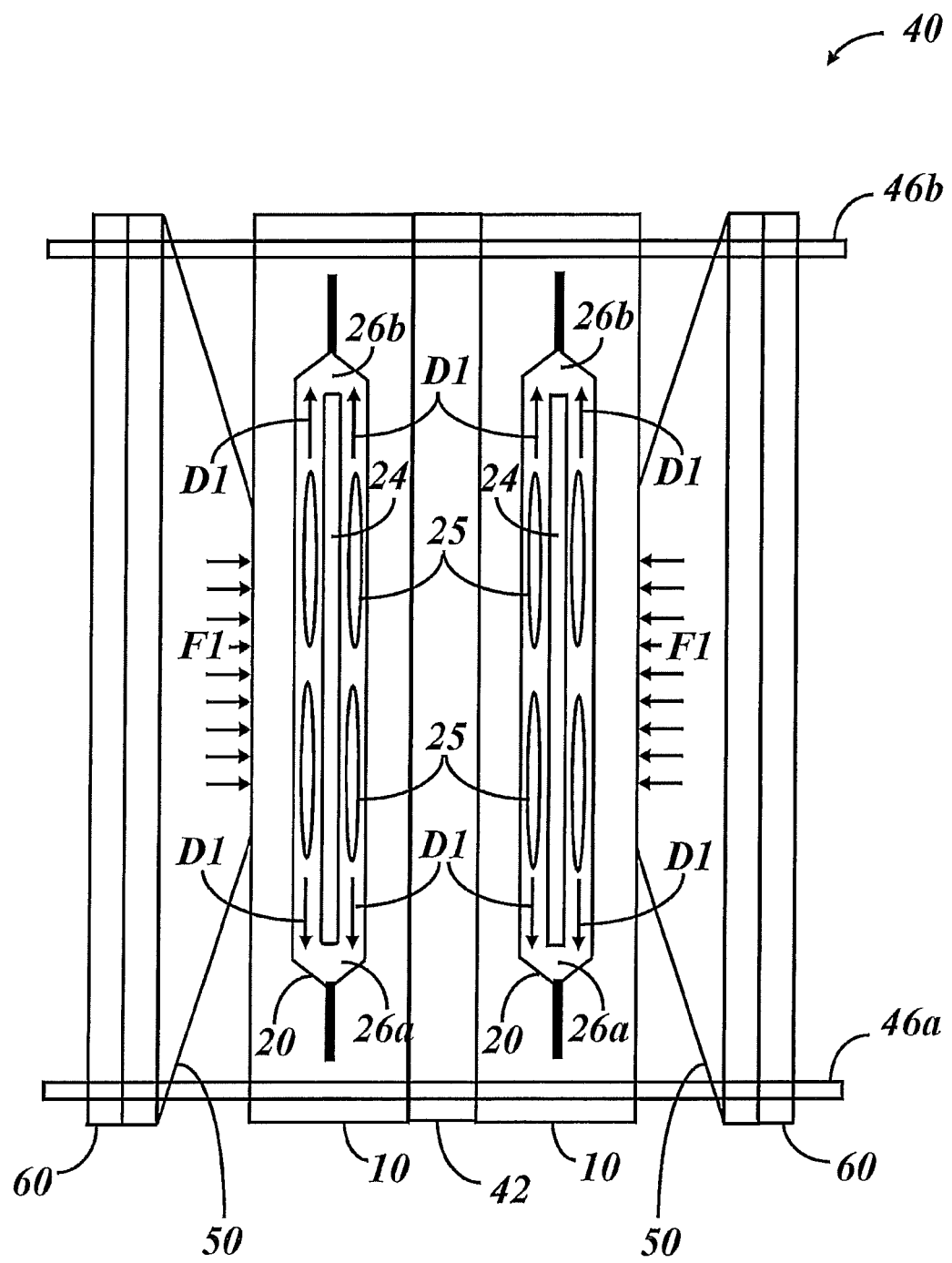
FIG. 2b is a schematic side elevational view of the battery module of FIG. 2a, shown assembled.

Referring now to FIG. 2b, an assembled battery module 40 is illustrated. The battery module 40 includes the cooling module 42 positioned between battery cell assemblies 10, with support members 50 and end frames 60 outboard of the battery cell assemblies 10. The compression members 46a-46d and the end frames 60 secure the battery module 40 together.

While the battery module 40 illustrated in FIG. 2b shows a quantity of two battery cell assemblies 10, it should be appreciated that in other embodiments, the battery module 40 can have any desired quantity of battery cell assemblies 10 and associated cooling modules 42 and support members 50.

Figure 3A:
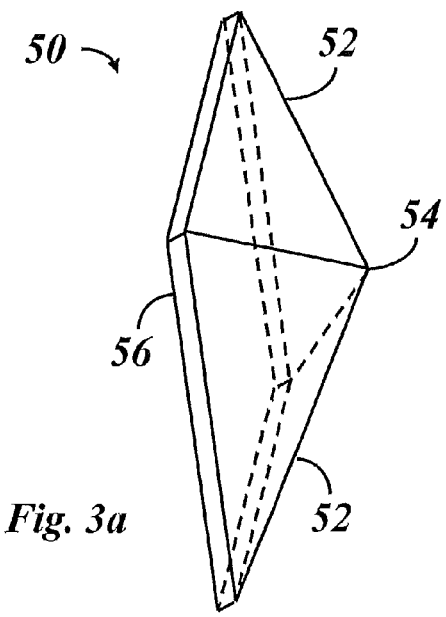
FIG. 3a is a schematic perspective view of a first embodiment of a support member.

Referring now to FIGS. 2a and 3a, the support members 50 have one or more inclined portions 52, converging to form a peak 54. As shown in FIG. 3a, the inclined portions 52 cooperate to form the general shape of a pyramid. However, as will be discussed in more detail below, the support members 50 can have other desired shapes. In the illustrated embodiment, the inclined portions 52 are supported by an attached base 56. However, it should be appreciated that in other embodiments the base 56 can be formed integral to the inclined portions 52. As shown in FIG. 2a, the base 56 includes a plurality of apertures 57a-57d (note only apertures 57a and 57b are shown) configured to correspond to the apertures 32a-32d in the frame 14 of the battery cell assembly 10. The apertures 57a-57d are configured to allow passage of compression members 46a-46d therethrough.

Referring again to FIG. 2b, in an assembled condition, each of the peaks 54 of the support members 50 is positioned to contact and compress a select portion of each battery cell assembly 10. In the illustrated embodiment, the additional compressive forces provided by the peaks 54 is in a range of from about 25 psi to about 50 psi. However, in other embodiments, the additional compressive forces can be less than about 25 psi or more than about 50 psi.

Without being held to the theory, it is believed that the additional focused compressive forces (as represented by direction arrows F1 in FIG. 2b) provided by the support members 50 form a pressure gradient within the battery package 12 that serves to urge the gases 25 formed within the case 20 to the peripheral spaces 26a-26d surrounding the electrode stack 24 (as represented by direction arrows D1 in FIG. 2b). In so doing, the displaced gases are substantially removed from areas of the electrode stack 24 that can suffer delamination of the electrical components.

In the embodiment shown in FIGS. 2a, 2b, and 3a, the support members 50 have a closed cell foamular structure and are formed from a polymeric-based material, such as for example polyurethane or polypropylene. However, in other embodiments, the support members can have other desired structures and can be made from other desired materials.

As further illustrated by the embodiment shown in FIGS. 2a and 3a, the peak 54 is positioned to focus additional compressive forces in a generally central area of the electrode stack 24. However, several alternative embodiments can be contemplated. First, it is contemplated that each of the support members can have several peaks, wherein the various peaks are configured to simultaneously focus additional compressive forces to different areas of the electrode stack 24. Second, it is contemplated that each of the support members can have several peaks, wherein the various peaks can be activated by programming to sequentially cycle additional compressive forces to different areas of the electrode stack 24, such as for example to form a circle of cycling compressive forces. The activation of the compressive forces of the various peaks can be achieved through any desired mechanism, such as for example micro-servos. Finally, it is also contemplated that the support members have several peaks of various heights, such as to result in areas of the electrode stack 24 having varying pressure densities. The varying pressure densities can be configured to focus the additional compressive forces in different areas of the electrode stack 24 as desired.

Figure 3B:
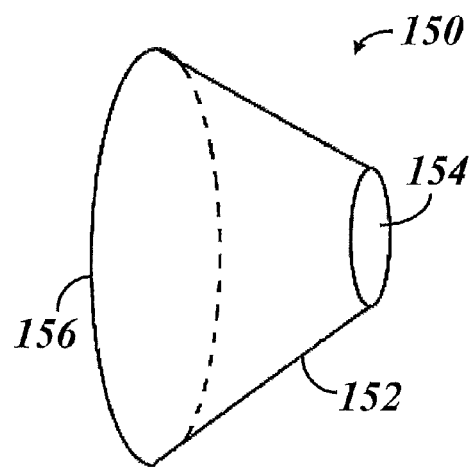
FIG. 3b is a schematic perspective view of a second embodiment of a support member.
Figure 3C:
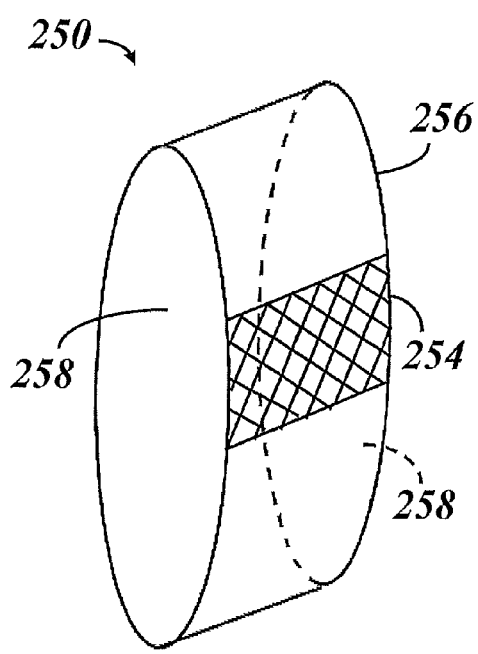
FIG. 3c is a schematic perspective view of a third embodiment of a support member.
Figure 3D:
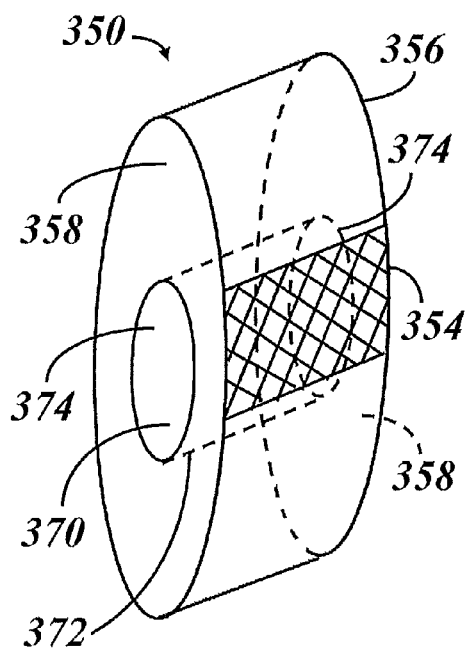
FIG. 3d is a schematic perspective view of a fourth embodiment of a support member.

In the embodiment illustrated in FIGS. 2a, 2b and 3a, the support members 50 have been described as having inclined portions 52 cooperating to form a peak 54. However, it is contemplated herein that the support members 50 can have other shapes and can include other structures. Referring now to FIGS. 3b-3d, additional embodiments of support members are shown.

Referring first to FIG. 3b, a support member 150 having a generally frustumular shape is illustrated. The support member 150 includes a circumferential incline outer surface 152, a contact surface 154 and an outboard surface 156. In operation, the support member 150 is positioned to focus additional compressive forces in a generally central area of the electrode stack 24, as described above. Optionally, the area of the contact surface 154 can any size sufficient to affect the central area of the electrode stack 24. Optionally, the support member 150 can include a base (not shown).

Referring now to FIG. 3c, another embodiment of a support member is shown generally at 250. The support member 250 has a generally ovular cross-sectional shape. The support member 250 includes a contact area 254 (indicated by the hatch marks), as a portion of an outer circumferential surface 256, and ends 258. In operation, the contact area 254 of the support member 250 is positioned to focus additional compressive forces in a generally central area of the electrode stack 24, as described above. Optionally, the contact area 254 of the outer circumferential surface 256 can any size sufficient to affect the central area of the electrode stack 24.

Referring now to FIG. 3d, another embodiment of a support member is shown generally at 350. The support member 350 is the same as, or similar to, the support member 250 shown in FIG. 3c and described above, with the addition of an insert 370. Accordingly, the support member 350 includes a contact area 354 (indicated by the hatch marks), an outer circumferential surface 356, and ends 238. The insert 370 includes a circumferential surface 372 and ends 374. In the illustrated embodiment, the insert 370 is a different material, having a different density, than the material forming the support member 350. The insert 370 is positioned to focus additional compressive forces in the contact area 354 of the electrode stack (not shown). The density of the insert 370 can be adjusted according to the desired contact area of the electrode stack.

While the insert 370 illustrated in FIG. 3d is shown as a generally cylindrically-shaped member, it should be appreciated that the insert 370 can have other desired shapes corresponding to the desired contact area of the electrode stack.

Figure 4:
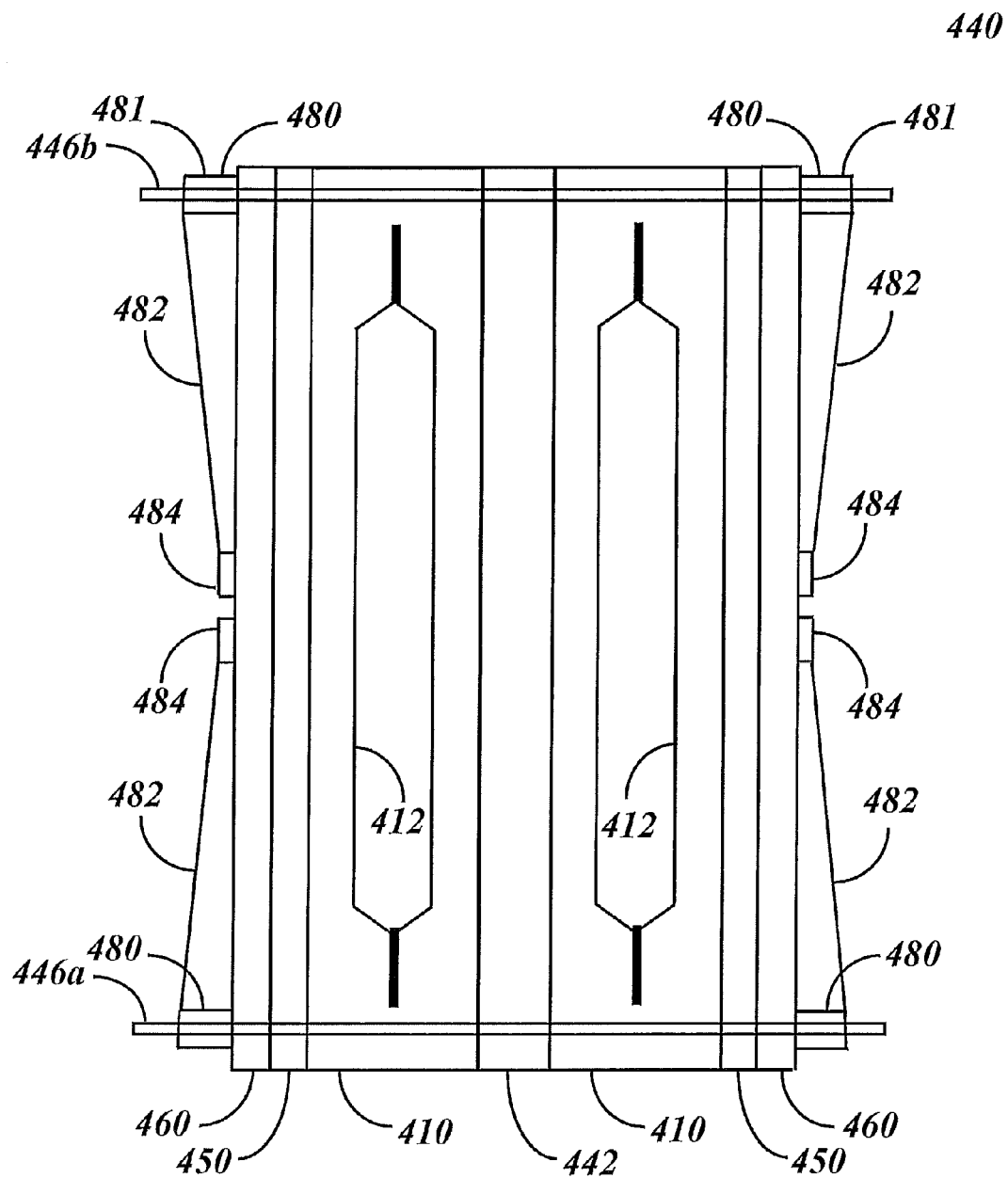
FIG. 4 is a schematic side elevational view of a second embodiment of a battery module.

FIGS. 3a-3d illustrate various embodiments of the support member. However, it should be appreciated that the support members can have any desired shape and configuration sufficient to focus additional compressive forces in the desired contact areas of the electrode stack. It still other embodiments, it should be further appreciated that additional compressive forces can be brought to the desired contact areas of the electrode stack by compressive structures distinct from the support members. FIG. 4 shows an embodiment of a battery module 440 having such distinct compressive structures.

Referring now to FIG. 4, the battery module 440 includes a cooling module 442 positioned between battery cell assemblies 410. The battery cell assemblies 410 include battery packages having cases for enclosing electrode stacks (for simplicity, the battery packages, cases and electrode stacks are not shown). In the illustrated embodiment, the cooling module 442 and battery cell assemblies 410 are the same as, or similar to, the cooling module 42 and the battery cell assembly 10 shown in FIG. 2b and described above. However, in other embodiments the cooling module 442 and battery cell assemblies 410 can be different than the cooling module 42 and the battery cell assembly 10.

Support members 450 are positioned on the outboard side of the battery cell assemblies 410. The support members 450 are configured to protectively support and cushion the battery cell assemblies 410. In the illustrated embodiment, the support members 450 are substantially flat in shape and have a foamular structure. Alternatively, the support members 450 can have any desired shape and can be formed from any desired material.

End frames 460 are positioned on the outboard side of the support members 450. The end frames cooperate with compression members 446a-446d to compress the battery module 440 as discussed above. In the illustrated embodiment, the end frames 460 and compression members 446a-446d are the same as, or similar to, the end frames 60 and the compression members 46a-46d in FIG. 2b and described above. However, in other embodiments the end frames 460 and compression members 446a-446d can be different than the end frames 60 and the compression members 46a-46d.

Referring again to FIG. 4, a compression assembly 480 is affixed to each end of the compression members 446a-446d. The compression assemblies 480 are configured to focus additional compressive forces on selected portions of the battery packages 412. Each compression assembly includes a hub 481, a spring member 482 and a compression pad 484. The hub 481 is attached to the compression member 446b such as to allow for axial movement along the compression member 446b. A first end of the spring member 482 is attached to the hub 481 and the other end of the spring member 482 is attached to the compression pad 484. The compression pad 484 is positioned to focus additional compressive forces in a generally central area of the battery package 412. In operation, as the hub 481 axially moves toward the end frame 460, the compressive force provided by the compression assembly 480 is increased.

While the compression assembly 480 shown in FIG. 4 is configured to focus additional compressive forces on selected portions of the battery packages 412. It should be appreciated that in other embodiments, other mechanisms, devices and structures can be used to distribute gases formed within the electrode stack to perimeter areas surrounding the electrode stack. One non-limiting example of an alternate method is the use of a pneumatic vacuum (not shown). The pneumatic vacuum can be configured to cooperate with peripheral vents in the case to pull gases from central areas of the electrode stack to the peripheral spaces.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A battery module comprising:
   a plurality of battery cell assemblies configured to electrically communicate with each other, each battery cell assembly having an electrode stack enclosed by a case, wherein the electrode stack is positioned in the case to form one or more peripheral spaces between the electrode stack and the case; and
   a support member positioned adjacent to the plurality of battery cell assemblies, the support member configured to focus a compressive force on a desired portion of the electrode stack, the support member including an insert; wherein the compressive force urges gases formed during operation of the electrode stack into the peripheral spaces within the case.

2. The battery module according to claim 1, wherein a cooling module is positioned between the battery cell assemblies.

3. The battery module according to claim 1, wherein the compressive force applied by the support member is in addition to a compressive force used to assemble the battery module.

4. The battery module according to claim 3, wherein the additional compressive force is in the range of from about 25 psi to about 50 psi.

5. The battery module according to claim 1, wherein the support member has the shape of a pyramid.

6. The battery module according to claim 1, wherein the insert is formed of a material having a different density that the material fanning the support member.

7. A battery module comprising:
   a plurality of battery cell assemblies configured to electrically communicate with each other, each battery cell assembly having an electrode stack enclosed by a case, wherein the electrode stack is positioned in the case to form one or more peripheral spaces between the electrode stack and the case; and
   a support member positioned adjacent to the plurality of battery cell assemblies, the support member configured to focus a compressive force on a desired portion of the electrode stack, the support member including an insert;
   wherein the compressive force produces a pressure gradient within the case that urges gases formed during operation of the electrode stack into the peripheral spaces within the ease.

8. The battery module according to claim 7, wherein a cooling module is positioned between the battery cell assemblies.

9. The battery module according to claim 7, wherein the compressive force applied by the support members is in addition to a compressive force used to assemble the battery module.

10. The battery module according to claim 9, wherein the additional compressive force is in the range of from about 25 psi to about 50 psi.

11. The battery module according to claim 7, wherein the support member has the shape of a pyramid.

12. The battery module according to claim 7, wherein the insert is formed of a material having a different density that the material forming the support member.

13. The battery module according to claim 7, wherein the pressure gradient includes varying pressure densities.

14. A method of forming a battery module comprising the steps of:
   providing a plurality of battery cell assemblies configured to electrically communicate with each other, each battery cell assembly having an electrode stack enclosed by a case, wherein the electrode stack is positioned in the case to form one or more peripheral spaces between the electrode stack and the case; and
   positioning a support member adjacent to the plurality of battery cell assemblies, the support member configured to focus a compressive force on a desired portion of the electrode stack, the support member including an insert, wherein the compressive force produces a pressure gradient within the case that urges gases formed during operation of the electrode stack into the peripheral spaces within the case.

15. The method according to claim 14, wherein a cooling module is positioned between the battery cell assemblies.

16. The method according to claim 14, wherein the compressive force applied by the support members is in addition to a compressive force used to assemble the battery module.

17. The method according to claim 16, wherein the additional compressive force is in the range of from about 25 psi to about 50 psi.

18. The method according to claim 14, wherein the support member has the shape of a pyramid.

* * * * *